(12) United States Patent
Suciu et al.

(10) Patent No.: US 9,637,218 B2
(45) Date of Patent: May 2, 2017

(54) AIRCRAFT WITH FORWARD SWEEPING T-TAIL

(71) Applicant: United Technologies Corporation, Hartford, CT (US)

(72) Inventors: Gabriel L. Suciu, Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 9 days.

(21) Appl. No.: 14/440,753

(22) PCT Filed: Mar. 14, 2013

(86) PCT No.: PCT/US2013/031139
§ 371 (c)(1),
(2) Date: May 5, 2015

(87) PCT Pub. No.: WO2014/074143
PCT Pub. Date: May 15, 2014

(65) Prior Publication Data
US 2015/0298794 A1    Oct. 22, 2015

Related U.S. Application Data

(60) Provisional application No. 61/725,114, filed on Nov. 12, 2012.

(51) Int. Cl.
*B64C 39/12* (2006.01)
*B64C 5/02* (2006.01)
(Continued)

(52) U.S. Cl.
CPC ............... *B64C 5/02* (2013.01); *B64C 5/06* (2013.01); *B64D 27/20* (2013.01); *B64D 33/04* (2013.01); *B64D 41/00* (2013.01); *F02K 1/62* (2013.01)

(58) Field of Classification Search
CPC .... B64C 5/06; B64C 5/02; B64C 1/04; B64D 27/20; B64D 33/04; B64D 41/00; B64D 47/00; F02K 1/62; F02K 1/54; F02K 3/02
See application file for complete search history.

(56) References Cited

U.S. PATENT DOCUMENTS 3,570,789 A * 3/1971 Rainey ...................... B64C 9/00
244/1 R
3,834,654 A * 9/1974 Miranda ............... B64C 39/068
244/13
(Continued)

OTHER PUBLICATIONS

Asbury et al. ("Static Performance of a Wing-Mounted Thrust Reverser Concept"), 1998.*
(Continued)

*Primary Examiner* — Brian M O'Hara
*Assistant Examiner* — Assres H Woldemaryam
(74) *Attorney, Agent, or Firm* — Carlson, Gaskey & Olds, P.C.

(57) ABSTRACT

An aircraft includes a propulsor supported within an aft portion of the fuselage. A thrust reverser is supported proximate the propulsor for redirecting thrust forward to slow the aircraft upon landing. A tail extending from the aft portion of the fuselage is angled forward away from the aft portion and out of the discharge of airflow from the thrust reverser.

18 Claims, 4 Drawing Sheets

(51) Int. Cl.
*B64D 33/04* (2006.01)
*B64C 5/06* (2006.01)
*B64D 27/20* (2006.01)
*F02K 1/62* (2006.01)
*B64D 41/00* (2006.01)

(56) References Cited

U.S. PATENT DOCUMENTS

| | | | |
|---|---|---|---|
| 3,936,017 A | 2/1976 | Blythe et al. | |
| 3,997,134 A * | 12/1976 | Drakeley | B64C 25/423 239/265.29 |
| 4,182,501 A | 1/1980 | Fage | |
| 4,365,773 A * | 12/1982 | Wolkovitch | B64C 39/068 244/123.7 |
| 5,230,213 A * | 7/1993 | Lawson | F02K 1/563 244/110 B |
| 5,284,015 A * | 2/1994 | Carimali | F02K 1/563 239/265.29 |
| 5,671,598 A * | 9/1997 | Standish | F02K 1/563 239/265.29 |
| 5,778,659 A | 7/1998 | Duesler et al. | |
| 5,875,995 A * | 3/1999 | Moe | B64D 33/04 239/265.29 |
| 6,170,780 B1 * | 1/2001 | Williams | B64C 1/00 244/15 |
| 6,487,845 B1 * | 12/2002 | Modglin | F02K 1/60 239/265.29 |
| 6,688,099 B2 | 2/2004 | Lair | |
| 7,735,774 B2 | 6/2010 | Lugg | |
| 8,091,827 B2 * | 1/2012 | Lair | F02K 1/60 244/110 B |
| 8,104,261 B2 | 1/2012 | Marshall et al. | |
| 8,109,466 B2 | 2/2012 | Aten et al. | |
| 8,127,530 B2 * | 3/2012 | Lair | F02K 1/60 239/265.33 |
| 8,127,532 B2 | 3/2012 | Howe | |
| 8,151,551 B2 | 4/2012 | Pero | |
| 8,172,175 B2 | 5/2012 | Lair | |
| 8,196,860 B2 * | 6/2012 | Gall | B64D 27/14 244/1 N |
| 2004/0026563 A1 * | 2/2004 | Moller | B64C 3/56 244/12.4 |
| 2008/0142641 A1 * | 6/2008 | Moore | B64C 39/12 244/215 |
| 2008/0245925 A1 * | 10/2008 | Udall | B64C 5/02 244/52 |
| 2009/0084889 A1 * | 4/2009 | Cazals | B64C 5/02 244/12.1 |
| 2009/0126341 A1 * | 5/2009 | Lair | F02K 1/60 60/226.2 |
| 2009/0127390 A1 * | 5/2009 | Lair | F02K 1/60 244/110 B |
| 2010/0032519 A1 * | 2/2010 | Chareyre | B64C 5/18 244/87 |
| 2010/0264676 A1 * | 10/2010 | Sternberger | B64C 13/00 292/302 |
| 2011/0101159 A1 * | 5/2011 | Lair | F02K 1/60 244/110 B |
| 2012/0324907 A1 * | 12/2012 | Waldron | B64D 29/06 60/797 |
| 2013/0205752 A1 * | 8/2013 | Suciu | F02K 3/025 60/226.1 |

OTHER PUBLICATIONS

International Preliminary Report on Patentability for International Application No. PCT/US2013/031139 mailed May 21, 2015.
International Search Report and Written Opinion for International Application No. PCT/US2013/031139 mailed Dec. 4, 2013.

* cited by examiner

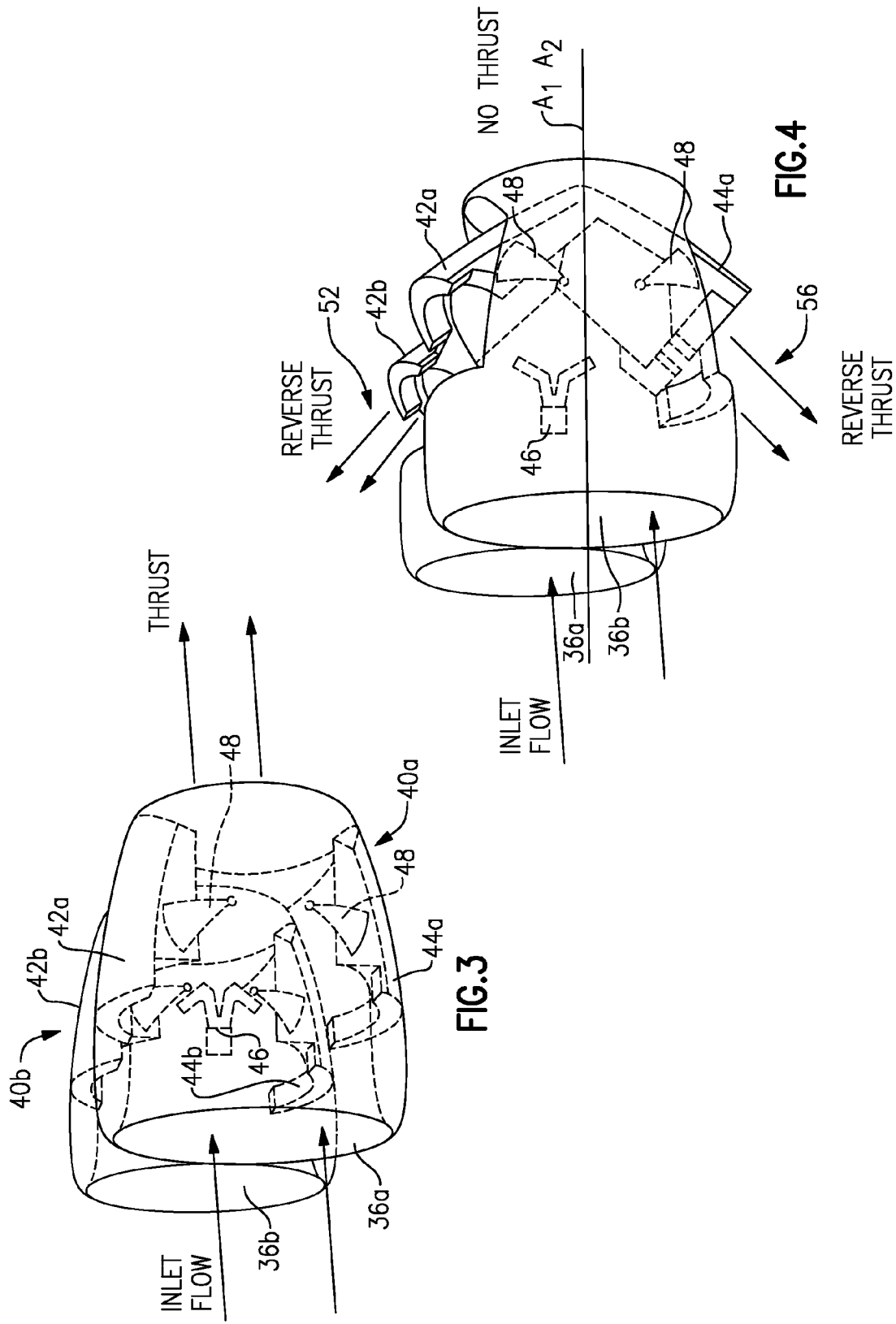

AIRCRAFT WITH FORWARD SWEEPING T-TAIL

CROSS REFERENCE TO RELATED APPLICATION

This application claims priority to U.S. Provisional Application No. 61/725,114 filed on Nov. 12, 2012.

STATEMENT REGARDING FEDERALLY SPONSORED RESEARCH OR DEVELOPMENT

This invention was made with government support under NASA Cooperative Agreement No. NNX11AB35A. The Government has certain rights in this invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Typically, the gas turbine engine is supported under an aircraft wing on either side of the fuselage. However, such under-wing installations may not be compatible with unique aircraft configurations. Accordingly, different mounting locations for the engines such as at the rear of the fuselage are being considered. Different mountings locations present different challenges and require alternate engine configurations.

A thrust reverser is utilized once an aircraft has landed, and creates a reverse thrust force to aid in slowing the aircraft. Typical thrust reversers and nozzles are components of the engine nacelle surrounding an under-wing mounted engine. Engines mounted within an aircraft fuselage do not include the same nacelle structures and therefore conventional thrust reversing devices may not be compatible.

Alternate aircraft architectures may require alternate mounting locations of the gas turbine engines to enable specific wing and fuselage configurations. However, conventional gas turbine engine configurations have been developed to operate with conventional aircraft architectures. Moreover, the alternate aircraft architectures may be tailored to accommodate gas turbine engine mounting locations.

Accordingly, alternate gas turbine engine configurations may be required and developed to enable implementation of favorable aspects of alternate engine architectures.

SUMMARY

A thrust reversing system according to an exemplary embodiment of this disclosure, among other possible things includes a thrust reverser supported proximate a propulsor system for selectively redirecting thrust, and a vertical stabilizer that is proximate to the propulsor system and extending forwardly away from the thrust reverser, whereby discharge flow from the thrust reverser is configured for being directed away from the vertical stabilizer.

In a further embodiment of the foregoing system, the vertical stabilizer extends upwardly from the aft section.

In a further embodiment of any of the foregoing systems, the vertical stabilizer is a tail includes a horizontal stabilizer supported on the vertical stabilizer. The horizontal stabilizer is angled forward away from the aft portion.

In a further embodiment of any of the foregoing systems, the vertical stabilizer is angled forward from a vertical plane a first angle greater than about thirty (30) degrees.

In a further embodiment of any of the foregoing systems, the horizontal stabilizer includes first and second parts that extend outward from the vertical stabilizer and form a second angle between forward edges.

In a further embodiment of any of the foregoing systems, the second angle is less than one-hundred eighty (180) degrees.

In a further embodiment of any of the foregoing systems, the horizontal stabilizer includes first and second parts that sweep forward at a third angle from the vertical stabilizer.

In a further embodiment of any of the foregoing systems, the thrust reverser directs airflow forward at a discharge flow angle relative to vertical plan extending from the aft portion and the tail is angled forward an angle greater than the discharge flow angle.

In a further embodiment of any of the foregoing systems, the tail includes a vertical stabilizer and a horizontal stabilizer, each of which swept forward an angle greater than the discharge flow angle.

In a further embodiment of any of the foregoing systems, the propulsion system comprises a first engine core driving a first fan within a first bypass passage disposed about a first propulsor axis and a second engine core driving a second fan within a second bypass passage disposed about a second propulsor axis and the thrust reverser includes a first and second thrust reversers each directing thrust forward at an angle relative to the vertical plane.

In a further embodiment of any of the foregoing systems, the first and second thrust reversers include corresponding first and second upper doors and first and second lower doors that are pivotally mounted for movement between a stowed position and a deployed position.

In a further embodiment of any of the foregoing systems, the first and second doors and the first and second lower doors close on a corresponding one of the first propulsor axis and the second propulsor axis to capture both a bypass flow stream and a core flow stream.

In a further embodiment of any of the foregoing systems, the tail includes a vertical stabilizer disposed between the first and second bypass passages.

In a further embodiment of any of the foregoing systems, the tail includes forward swept vertical and horizontal stabilizer that are disposed outside of a discharge from the thrust reverser.

An aircraft according to an exemplary embodiment of this disclosure, among other possible things includes a fuselage including an aft portion, a propulsor supported within the aft portion of the fuselage, a thrust reverser supported proximate the propulsor for redirecting thrust forward to slow the aircraft upon landing, and a tail extending from the aft portion of the fuselage and angled forward away from the aft portion and out of a discharge flow from the thrust reverser.

In a further embodiment of the foregoing aircraft, the tail includes a vertical stabilizer angled forward away from the aft portion.

In a further embodiment of any of the foregoing aircrafts, the tail includes a horizontal stabilizer supported on the vertical stabilizer. The horizontal stabilizer is angled forward away from the aft portion.

In a further embodiment of any of the foregoing aircrafts, the horizontal stabilizer includes first and second parts that sweep forward at a third angle from the vertical stabilizer.

In a further embodiment of any of the foregoing aircrafts, the thrust reverser directs airflow forward at a discharge flow angle relative to vertical plan extending from the aft portion and the tail is angled forward an angle greater than the discharge flow angle.

In a further embodiment of any of the foregoing aircrafts, the propulsion system comprises a first engine cores driving a first fan within a first bypass passage disposed about a first propulsor axis and a second engine core driving a second fan within a second bypass passage disposed about a second propulsor axis and the thrust reverser includes a first and second thrust reversers each directing thrust forward at an angle relative to the vertical plane.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 3 is a schematic view of view of an example thrust reverser in a stowed position.

FIG. 4 is a schematic view of the example thrust reverser in a deployed position.

DETAILED DESCRIPTION

Figure 1:
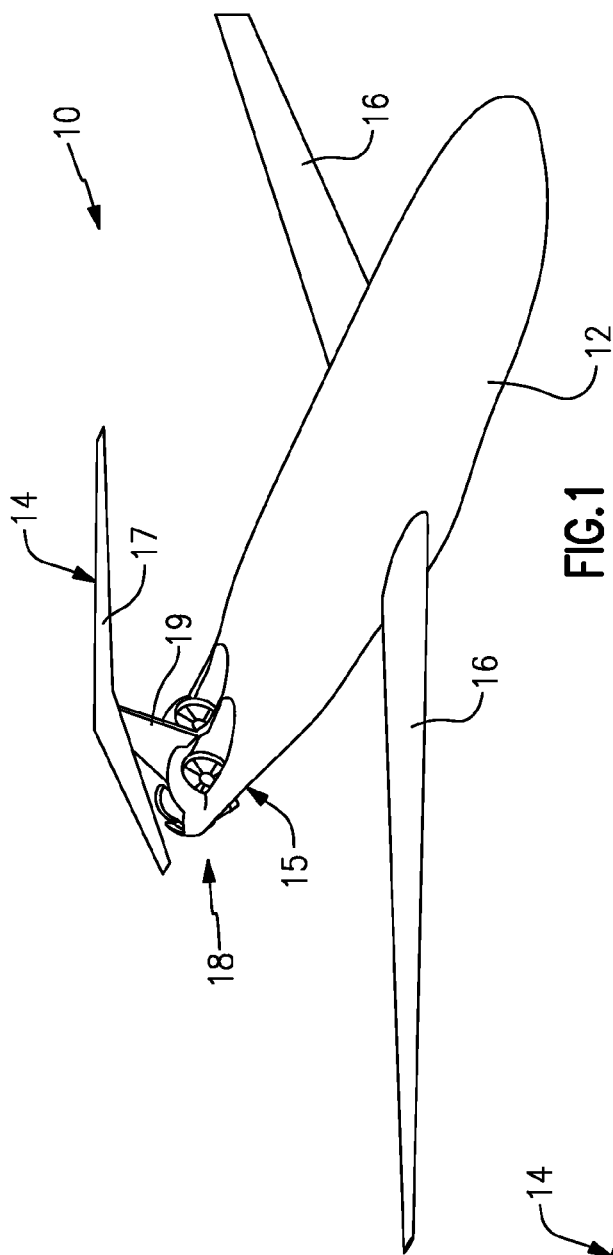
FIG. 1 schematically shows an example aircraft with a propulsion system mounted within a fuselage.
Figure 2:
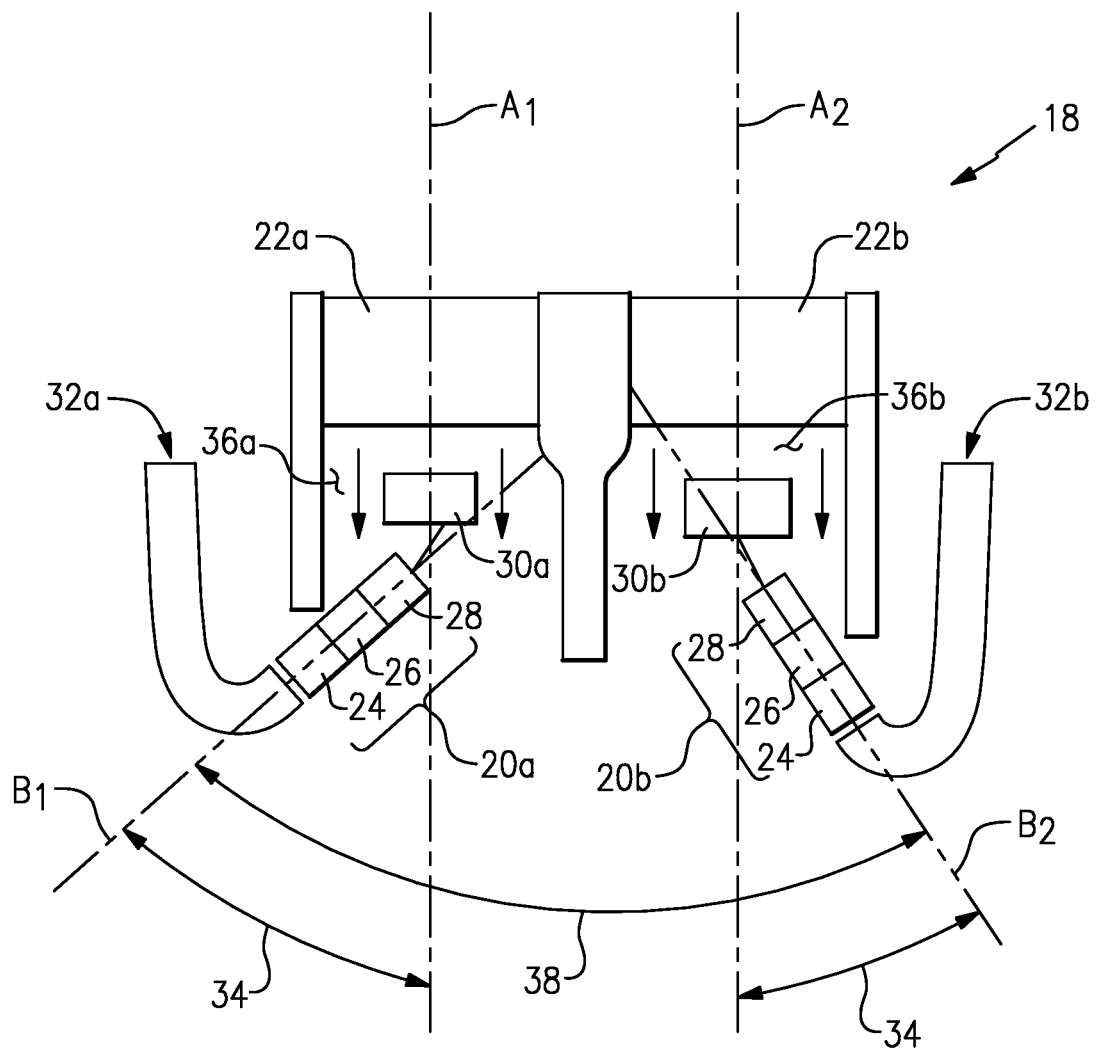
FIG. 2 is a schematic view of an example reverse flow gas turbine engine.

Referring to the FIGS. 1 and 2 an aircraft 10 includes a fuselage 12 having wings 16 and a tail 14. A propulsion system 18 is mounted in aft end 15 of the fuselage 12. The tail 14 is swept forward away from the aft portion 15 and includes a horizontal stabilizer 17 supported atop a vertical stabilizer 19.

The propulsion system 18 includes first and second engine cores 20a-b, which are reverse core gas turbine engines that drive corresponding first and second propulsors that include respective fan sections 22a-b. The first and second fan sections 22a-b provide the propulsive thrust through corresponding first and second bypass passages 36a-b.

Each of the fan sections 22a-b are disposed about corresponding first and second propulsor axis A1 and A2. The first and second engine cores 20a-b is disposed about a corresponding first and second engine axis B1 and B2. That is the first engine core 20a is disposed about the first engine axis B1 and drives the first propulsor about the first propulsor axis A1. The second engine core 20b is disposed about the second engine axis B2 and drives the second fan section 20b about the second propulsor axis A2.

The illustrated engine cores 20a-b are gas generators that include a compressor 24, a combustor 26 and a turbine 28. Air is drawn in through inlets 32a-b to the compressor 24 is compressed and communicated to a combustor 26. In the combustor 26, air is mixed with fuel and ignited to generate an exhaust gas stream that expands through the turbine 28 where energy is extracted and utilized to drive the compressor 24 and corresponding fan 22a-b. In this example the engine cores 20a-b drive the corresponding fan 22a-b through a geared architecture 30a-b; this is also considered part of each respective propulsor.

In the disclosed example, each of the first and second propulsors 22a-b is mounted substantially parallel to each other about respective propulsor axes A1, A2. The first and second engine core axes B1, B2 are disposed at an angle 34 relative to the corresponding propulsor axis A1, A2. The engine cores 20a-b are also angled away from each other at an angle 38.

Referring to FIGS. 3 and 4, the aircraft includes a thrust reverser for directing thrust to slow the aircraft 10 upon landing. The disclosed thrust reverser includes a first thrust reverser 40a and a second thrust reverser 40b for corresponding bypass passages 36a-b. The first and second thrust reversers 40a-b include corresponding first and second upper doors 42a, 42b and first and second lower doors 44a, 44b.

The upper and lower doors 42a-b, 44a-b is movable between a stowed position (FIG. 3) and a deployed position (FIG. 4). Movement of the upper and lower doors 42a-b, 44a-b, is facilitated by pivots 48 that support rotation between stowed and deployed positions. An actuator 46 is provided to move the upper and lower doors 42a-b, 44a-b between the stowed and deployed positions.

In the stowed position, thrust flows unimpeded through the bypass passages 36a-b. In the deployed position, discharge airflow is directed upwardly as indicated at 52 and downwardly as indicated at 56 about the propulsor axes A1, A2. The upward and downward directed airflows 52, 54 slow the aircraft 10 during landing. In some aircraft architectures, the upward directed discharge airflow 52 can impact control surfaces of the tail 14. Discharge airflow 52 impact on control surfaces is not desired as it may impact on aircraft stability.

Figure 5:
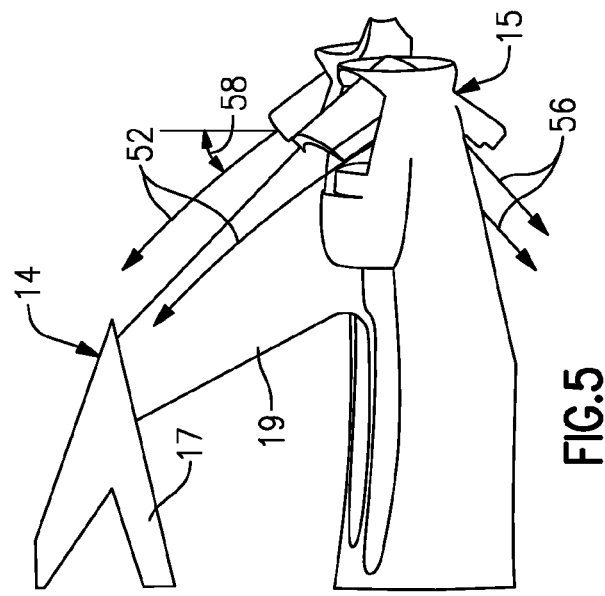
FIG. 5 is a perspective view of discharge flow from the thrust reverser relative to a tail of the aircraft.

Referring to FIG. 5, the discharge airflow 52 is expelled forward at a discharge flow angle 58. The tail 14 is swept forward an angle greater than the discharge flow angle 58 such that discharge airflow 52 does not impact any part of the tail 14. The vertical stabilizer 19 is angled forward away from the aft portion 15 such that the discharge airflow 52 flows behind the tail 14. Moreover, the horizontal stabilizer 17 is also swept forward out of the path of the discharge airflow 52.

Figure 6:
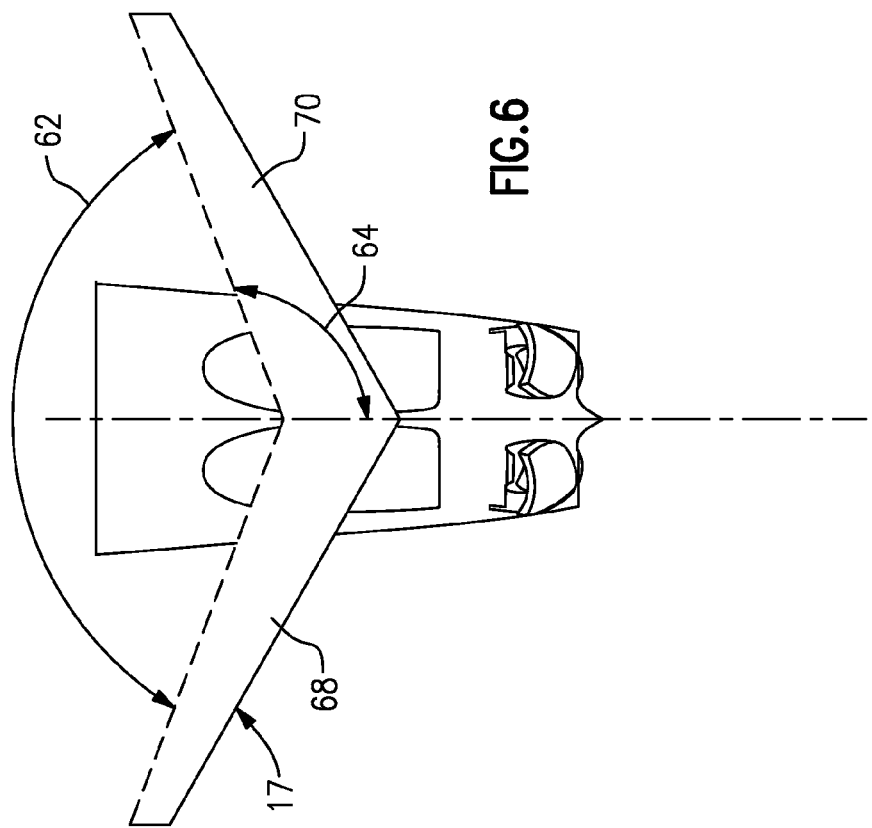
FIG. 6 is a top view of a horizontal stabilizer of the tail.
Figure 7:
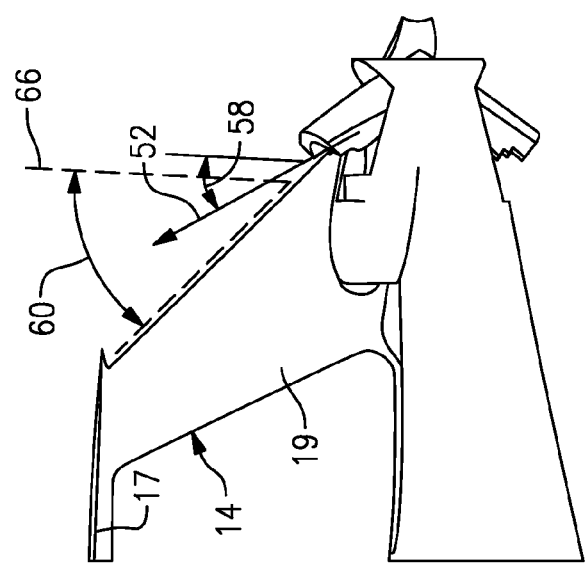
FIG. 7 is a side view of a vertical stabilizer of the tail.

Referring to FIGS. 6 and 7 with continued reference to FIG. 5, the vertical stabilizer 19 is angled forward a first angle 60 from a vertical plane 66. In this example the first angle is greater than about thirty (30) degrees. As appreciated, the first angle 60 may vary depending on the discharge flow angle 58 to maintain the tail 14 out of the discharge airflow 52.

The horizontal stabilizer 17 is supported atop the vertical stabilizer 19 and includes a first part 68 and a second part 70 that extend outward from the vertical stabilizer 19. The example vertical stabilizer is disposed along a centerline of the fuselage 13 between bypass passages 36a-b. The first and second parts 68, 70 are angled forward and include a second angle 62 between forward edges. The second angle 62 is less than one-hundred-eighty (180) degrees in this disclosed example; however the second angle may be any amount determined to maintain the horizontal stabilizer 17 out of the discharge airflow 52.

The forward edges of the first and second parts 68 and 70 are angled forward from the vertical stabilizer a third angle 64. The third angle 64 is greater than ninety (90) degrees to maintain the horizontal stabilizer 17 outside of the discharge airflow 52.

Accordingly, the example aircraft 10 includes a tail 14 configured to remain outside of any discharge airflow 52 generated by the thrust reversers to maintain aircraft stability.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A thrust reversing system comprising:
   a thrust reverser supported proximate a propulsor system for selectively redirecting thrust; and
   a vertical stabilizer that is proximate to the propulsor system and extending forwardly from an aft fuselage section away from the thrust reverser, whereby discharge flow from the thrust reverser is configured for being directed away from the vertical stabilizer, wherein the thrust reverser directs airflow forward at a discharge flow angle relative to a vertical plan extending from the aft fuselage section and the vertical stabilizer is angled forward an angle greater than the discharge flow angle.

2. The system of claim 1, wherein the vertical stabilizer extends upwardly from the aft fuselage section.

3. The system of claim 2, wherein the vertical stabilizer is one portion of a tail, the tail further including a horizontal stabilizer supported on the vertical stabilizer, wherein the horizontal stabilizer is angled forward away from the aft fuselage section.

4. The system of claim 2, wherein the vertical stabilizer is angled forward from a vertical plane a first angle greater than about thirty (30) degrees.

5. The system of claim 3, wherein the horizontal stabilizer includes first and second parts that extend outward from the vertical stabilizer and form a second angle between forward edges.

6. The system of claim 5, wherein the second angle is less than one-hundred eighty (180) degrees.

7. The system of claim 3, wherein the horizontal stabilizer includes first and second parts that sweep forward at a third angle from the vertical stabilizer.

8. The system of claim 3, wherein the vertical stabilizer and the horizontal stabilizer are each angled forward an angle greater than the discharge flow angle.

9. The system of claim 1, including a propulsion system comprising a first engine core driving a first fan within a first bypass passage disposed about a first propulsor axis and a second engine core driving a second fan within a second bypass passage disposed about a second propulsor axis and the thrust reverser comprises a first and second thrust reversers each directing thrust forward at an angle relative to the vertical plane.

10. The system of claim 9, wherein the first and second thrust reversers comprise corresponding first and second upper doors and first and second lower doors that are pivotally mounted for movement between a stowed position and a deployed position.

11. The system of claim 10, wherein the first and second upper doors and the first and second lower doors close on a corresponding one of the first propulsor axis and the second propulsor axis to capture both a bypass flow stream and a core flow stream.

12. The system of claim 9, wherein the vertical stabilizer is disposed between the first and second bypass passages.

13. The system of claim 2, wherein the vertical stabilizer is one portion of a tail, further including a horizontal stabilizer and each of the vertical stabilizer and the horizontal stabilizer are disposed outside of a discharge airflow from the thrust reverser.

14. An aircraft comprising;
   a fuselage including an aft portion;
   a propulsor supported within the aft portion of the fuselage;
   a thrust reverser supported proximate the propulsor for redirecting thrust forward to slow the aircraft upon landing; and
   a tail extending from the aft portion of the fuselage and angled forward away from the aft portion and out of a discharge flow from the thrust reverser, wherein the thrust reverser directs airflow forward at a discharge flow angle relative to a vertical plan extending from the aft portion and the tail is angled forward an angle greater than the discharge flow angle.

15. The aircraft as recited in claim 14, wherein the tail includes a vertical stabilizer angled forward away from the aft portion.

16. The aircraft as recited in claim 15, wherein the tail includes a horizontal stabilizer supported on the vertical stabilizer, wherein the horizontal stabilizer is angled forward away from the aft portion.

17. The aircraft as recited in claim 16, wherein the horizontal stabilizer includes first and second parts that sweep forward at a third angle from the vertical stabilizer.

18. The aircraft as recited in claim 14, wherein the propulsor comprises a first engine core driving a first fan within a first bypass passage disposed about a first propulsor axis and a second engine core driving a second fan within a second bypass passage disposed about a second propulsor axis and the thrust reverser comprises a first and second thrust reversers each directing thrust forward at an angle relative to the vertical plane.

* * * * *

UNITED STATES PATENT AND TRADEMARK OFFICE
CERTIFICATE OF CORRECTION

PATENT NO. : 9,637,218 B2  
APPLICATION NO. : 14/440753  
DATED : May 2, 2017  
INVENTOR(S) : Gabriel L. Suciu and Jesse M. Chandler It is certified that error appears in the above-identified patent and that said Letters Patent is hereby corrected as shown below:

In the Claims

In Claim 1, Column 5, Line 20; after "vertical" replace "plan" with --plane--

In Claim 14, Column 6, Line 29; before "extending from" replace "plan" with --plane--

Signed and Sealed this  
Twenty-ninth Day of August, 2017

Joseph Matal  
*Performing the Functions and Duties of the*  
*Under Secretary of Commerce for Intellectual Property and*  
*Director of the United States Patent and Trademark Office*